United States Patent
Courtright et al.

(10) Patent No.: US 9,707,905 B2
(45) Date of Patent: Jul. 18, 2017

(54) REINFORCEMENT FOR PICKUP TRUCK FLOOR PAN

(71) Applicant: Ford Global Technologies, LLC, Dearborn, MI (US)

(72) Inventors: Mark Joseph Courtright, Allen Park, MI (US); John Comiez, Novi, MI (US); Vincent Anthony Chimento, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/823,172

(22) Filed: Aug. 11, 2015

(65) Prior Publication Data

US 2017/0043729 A1    Feb. 16, 2017

(51) Int. Cl.
*B62D 25/20*    (2006.01)
*B62D 33/02*    (2006.01)
*B60R 13/01*    (2006.01)

(52) U.S. Cl.
CPC .......... *B60R 13/01* (2013.01); *B62D 25/2054* (2013.01); *B62D 33/02* (2013.01)

(58) Field of Classification Search
CPC  B62D 25/20; B62D 25/2054; B62D 25/2027; B62D 33/02; B62D 24/02; B60R 13/01
USPC .......... 296/204, 181.4, 183.1, 184.1, 187.08, 296/193.07
See application file for complete search history.

(56) References Cited

U.S. PATENT DOCUMENTS

| | | | |
|---|---|---|---|
| 4,450,926 A | 5/1984 | Suzuki | |
| 5,127,704 A | 7/1992 | Komatsu | |
| 5,188,418 A * | 2/1993 | Walworth, Jr. .... | B62D 25/2054 296/184.1 |
| 5,730,486 A * | 3/1998 | Jurica ................ | B62D 25/2054 296/184.1 |
| 6,347,454 B1 * | 2/2002 | Jurica ................ | B62D 25/2054 29/417 |
| 6,371,545 B1 * | 4/2002 | Yang ...................... | B60N 2/015 296/204 |
| 6,604,781 B2 | 8/2003 | Uchida | |
| 7,823,958 B2 | 11/2010 | Sato | |
| 8,414,066 B2 * | 4/2013 | Hustyi ................. | B60P 7/0807 296/193.01 |
| 9,090,293 B1 * | 7/2015 | Courtright ......... | B62D 25/2027 |
| 9,221,500 B1 * | 12/2015 | Courtright ........... | B62D 33/077 |
| 2005/0236867 A1 * | 10/2005 | McNulty ............. | B62D 33/023 296/183.1 |
| 2008/0150322 A1 * | 6/2008 | Shelbo ................. | B21D 13/045 296/184.1 |

(Continued)

FOREIGN PATENT DOCUMENTS

DE    102007021223 A1    11/2008
JP        H11268668 A    10/1999

*Primary Examiner* — Gregory Blankenship
(74) *Attorney, Agent, or Firm* — Jason Rogers; Brooks Kushman P.C.

(57) ABSTRACT

A reinforcement assembly is provided for a pickup truck bed. The reinforcement is assembled to a cross member that supports the pickup truck bed. The reinforcement includes a bridge spanning a channel defined by the cross member. The reinforcement assembly is suspended on tabs that are received in recesses defined by a front weld flange and a rear weld flange. A urethane isolator is utilized to secure the cross member to a frame component.

20 Claims, 2 Drawing Sheets

(56) References Cited

U.S. PATENT DOCUMENTS

2008/0277971 A1* 11/2008 Sato ................ B62D 21/03
            296/203.04
2011/0298245 A1* 12/2011 Jarocki ............. B62D 21/03
            296/193.07
2015/0375818 A1* 12/2015 Courtright ......... B62D 33/02
            296/183.1

* cited by examiner

REINFORCEMENT FOR PICKUP TRUCK FLOOR PAN

TECHNICAL FIELD

This disclosure relates to supporting structures and reinforcements for a pickup truck bed floor pan.

BACKGROUND

Pickup trucks include a truck bed that has a floor pan onto which cargo is loaded. The floor pan may exhibit distortion or cracks when cargo is loaded onto the floor pan. Heavy loads may crush down on the floor pans beads from above at locations where a structural cross member rests on the frame. This issue is more pronounced with pickup trucks that have higher payloads and that have aluminum floor pans. The material properties of aluminum make the floor pan more susceptible to deformation while carrying extremely heavy loads in the pickup box. Aluminum pickup trucks have increased payload capacity compared to heavier steel trucks.

An important aspect of pickup truck beds is that they must exhibit excellent durability to meet the expectations of truck owners. Cracks in the floor pan or other surface defects adversely affect truck owners' perception of quality and overall satisfaction.

This disclosure is directed to the above problems and other problems as summarized below.

SUMMARY

According to one aspect of this disclosure, a reinforcement assembly is provided for a floor pan having a cross member defining a channel. A reinforcement including a bridge spanning the channel and a plurality of tabs extending outboard from the bridge to suspend the reinforcement from the cross member. The reinforcement includes side walls extending from the bridge into the channel. A plurality of fasteners are inserted through the cross member and the side walls to secure the reinforcement assembly to the side walls.

According to another aspect of this disclosure, a pickup truck bed is disclosed that comprises a frame, a urethane isolator, a cross member, a reinforcement and a floor pan. The urethane isolator is attached to the frame and the cross member is attached to the urethane isolator. The reinforcement is attached to the cross member and the floor pan is attached to the cross member and the reinforcement. The cross member defines a transversely extending channel recess with a front weld flange adjacent a front side of the channel recess and a rear weld flange adjacent a rear side of the channel recess. The reinforcement includes a bridge spanning the channel and tabs disposed on the weld flanges to suspend the bridge within the channel. The floor pan has a plurality of floor pan beads separated by base portions of the floor pan.

Other aspects of this disclosure that are applicable to the pickup truck bed or the reinforcement assembly as described above are summarized below.

The urethane isolator may be attached to a frame component that partially encloses the cross member on the outside of the cross member that defines the channel.

The bridge functions to support a base portion of a floor pan bead of the floor pan of a pickup truck.

The cross member may further comprise front and rear weld flanges to which a base portion of the floor pan is welded to the weld flanges. The front and rear weld flanges define recesses that and the tabs are received in to locate the reinforcement on the cross member. A top surface of the tabs is flush with an upper surface of the cross member. The tabs and recesses are located on the reinforcement below an upper portion of a floor pan bead.

The bridge may define at least one aperture to lighten the reinforcement.

A recessed rib may be provided on the bridge to strengthen the bridge.

The base portion of a floor pan bead rests upon the front weld flange, the rear weld flange, and an upper surface of the bridge.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
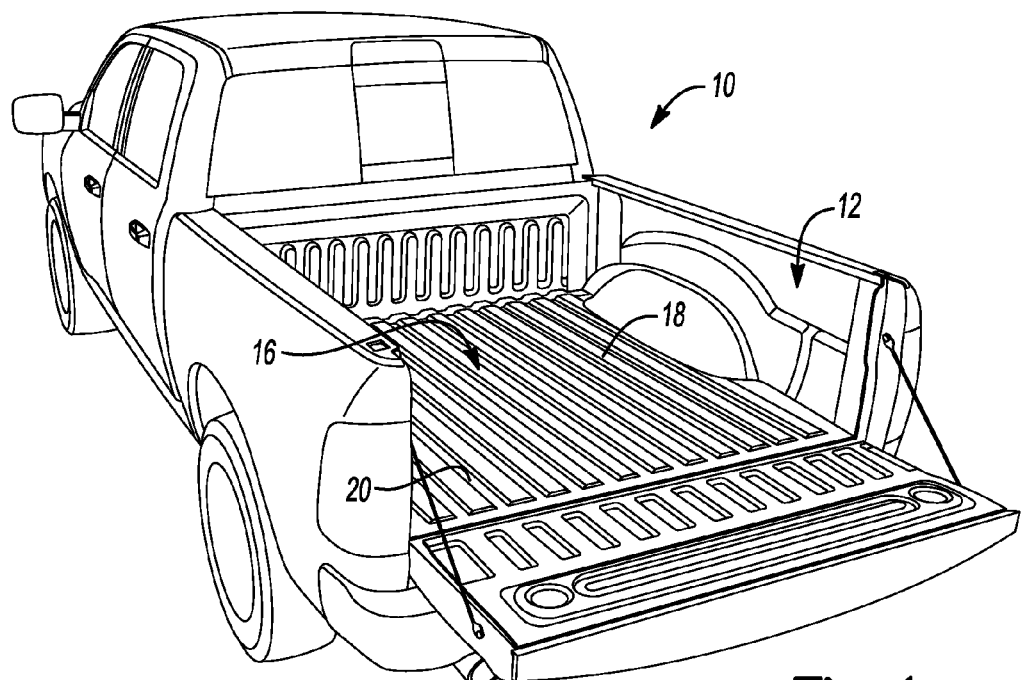
FIG. 1 is a rear/side perspective view of a pickup truck.

Referring to FIG. 1, a pickup truck 10 is illustrated that includes a truck bed 12. The truck bed 12 includes a floor pan 16. The floor pan 16 includes a plurality of floor pan beads 18 that are separated by base portions 20 of the floor pan 16.

Figure 2:
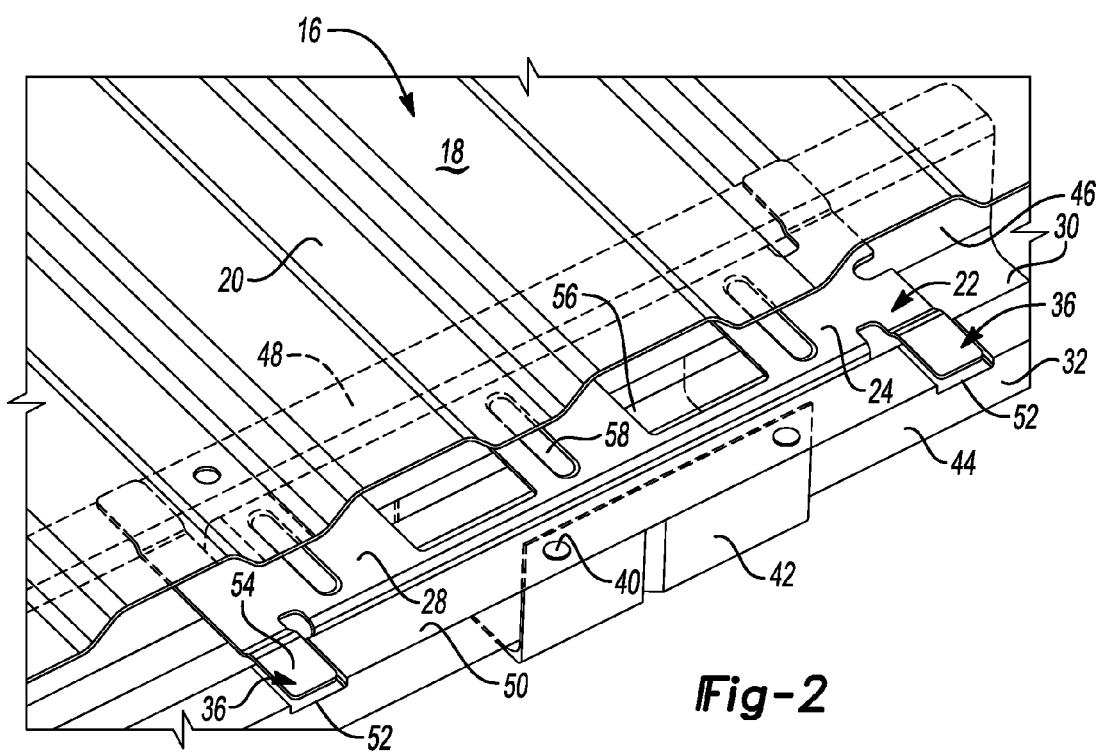
FIG. 2 is a fragmentary perspective view partially in cross-section of a reinforcement assembly attached to a pickup truck bed in accordance with this disclosure.
Figure 3:
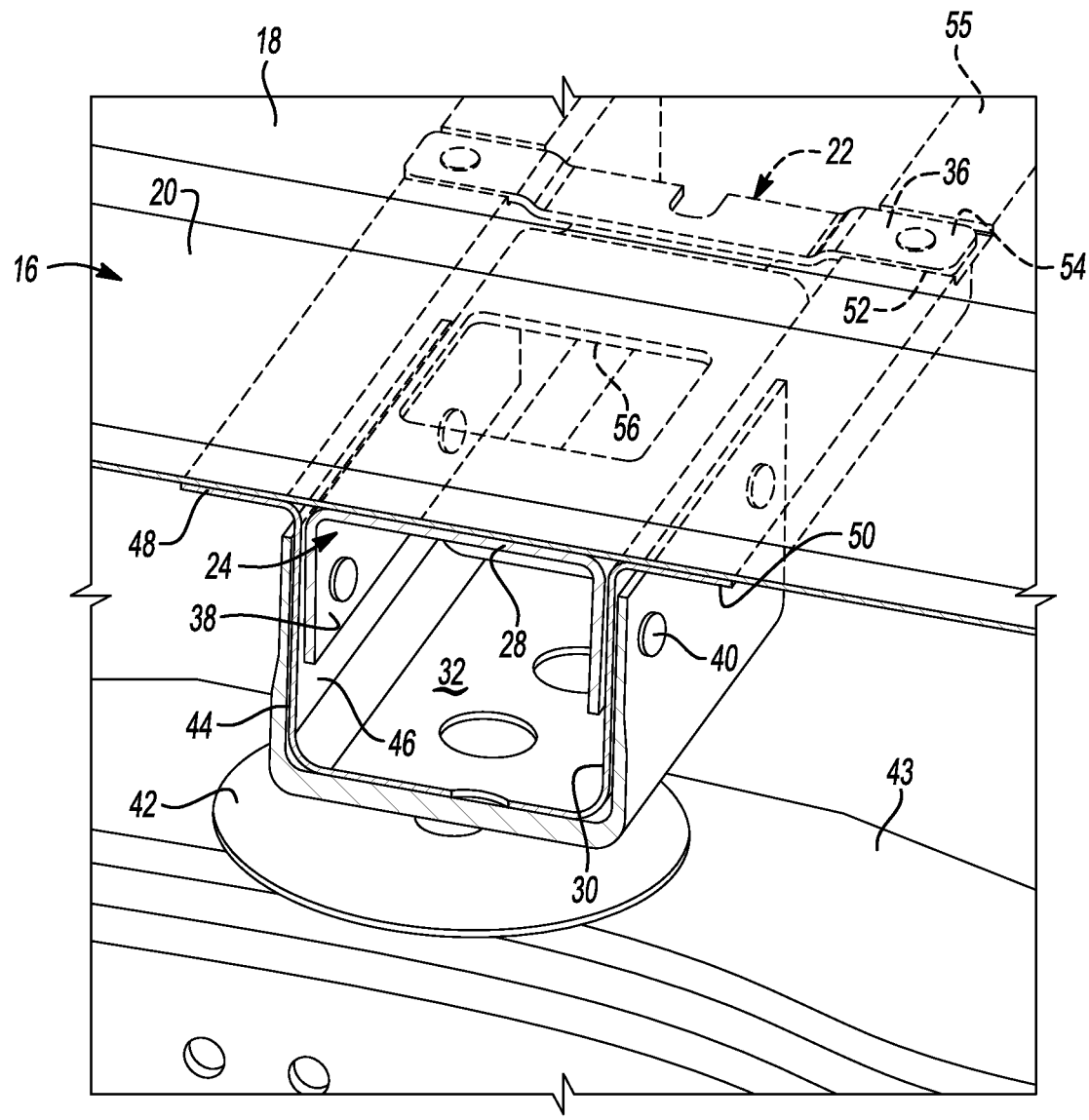
FIG. 3 is a fragmentary perspective view partially in cross-section showing the reinforcement assembly assembled between the pickup truck bed pan and frame component in accordance with this disclosure.

Referring to FIGS. 2 and 3, a reinforcement assembly is generally indicated by reference numeral 22. The reinforcement assembly 22 includes a reinforcement 24. Reinforcement 24 includes a bridge 28 that extends across a channel 30 defined by a cross member 32. A plurality of tabs 36 are provided on the reinforcement to support the bridge 28 within the channel 30. The reinforcement 24 includes two side walls 38 that are received within the channel 30 defined by the cross member 32.

A plurality of fasteners 40, such as rivets, self-piercing rivets, flow drill screws, or the like, are utilized to secure the reinforcement 24 to the channel 30. A urethane isolator 42 is attached to the frame 43 to prevent squeak and rattle between the box and the frame 43. The pickup box rests on the frame 43 and is physically attached to the frame component 43 by the box bolts (not shown) which are not connected to the isolator. The isolator 42 is assembled to an outer side of the cross member 32. The reinforcement 24 is secured to the inner side 46 of the channel 30 defined by the cross member 32. The reinforcement 24 includes a front weld flange 48 and a rear weld flange 50. Base portions 20 of the floor pan 16 are welded to the front weld flange 48 and the rear weld flange 50.

The tabs 36 are attached to the front weld flange 48 and the rear weld flange 50. Recesses 52 may be formed in the front weld flange 48 and the rear weld flange 50 to receive the tabs 36. The recesses 52 laterally locate the reinforcement 24 on the cross member 32. The side walls 38 locate the reinforcement 24 within the channel 30 defined by the cross member 32. A top surface 54 of tabs 36 is flush with the upper surface 55 of the front weld flange 48 and the rear weld flange 50.

One or more apertures 56 may be provided in the bridge 28 to reduce the weight of the reinforcement 24. A plurality of recessed ribs 58, as shown in FIG. 2, may be provided to strengthen or reinforce the bridge 28.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A reinforcement assembly for a floor pan having a cross member defining a channel, comprising:
   a reinforcement including a bridge spanning the channel, a plurality of tabs extending outboard from the bridge suspending the reinforcement from the cross member, and side walls extending from the bridge into the channel; and
   a plurality of fasteners inserted through the cross member and the side walls to secure the reinforcement assembly to the side walls.

2. The reinforcement assembly of claim 1 further comprising:
   a urethane isolator attached to a frame component that partially encloses the cross member on an opposite side of the cross member from the reinforcement.

3. The reinforcement assembly of claim 1 wherein the bridge supports a base portion of a floor pan disposed between a plurality of beads of the floor pan of a pickup truck.

4. The reinforcement assembly of claim 1 wherein the cross member further comprises:
   front and rear weld flanges, and wherein a base portion of a floor pan bead of the floor pan is welded to the weld flanges.

5. The reinforcement assembly of claim 4 wherein the front and rear weld flanges define at least one recess, wherein at least one of the tabs are received in the recess and locates the reinforcement on the cross member, and wherein a top surface of each tab is flush with an upper surface of the cross member.

6. The reinforcement assembly of claim 4 wherein the front and rear weld flanges define a plurality of recesses, wherein each of the tabs are received in one of the recesses and locate the reinforcement on the cross member, and wherein the tabs and recesses are disposed on the reinforcement below a floor pan bead.

7. The reinforcement assembly of claim 1 wherein the bridge defines at least one aperture to lighten the reinforcement assembly.

8. The reinforcement assembly of claim 1 wherein a recessed rib is provided on the bridge to strengthen the bridge.

9. The reinforcement assembly of claim 1 further comprising:
   front and rear weld flanges, wherein a base portion of a floor pan bead rests upon the front and rear weld flanges and an upper surface of the bridge.

10. The reinforcement assembly of claim 1 further comprises:
    a urethane isolator attached to a frame component that partially encloses the cross member on an outer side of the cross member that defines the channel; and
    front and rear weld flanges, wherein a base portion of a floor pan bead of the floor pan is welded to the weld flanges, wherein the front and rear weld flanges define a plurality of recesses, wherein the tabs are received in the recesses and locate the reinforcement on the cross member, wherein a top surface of the tabs are flush with an upper surface of the cross member, and wherein the tabs and recesses are disposed on the reinforcement below an upper portion of a floor pan bead.

11. A pickup truck bed comprising:
    a frame;
    a urethane isolator attached to the frame;
    a cross member attached to the urethane isolator, the cross member defining a transversely extending channel, a front weld flange adjacent a front side of the channel, and a rear weld flange adjacent a rear side of the channel;
    a reinforcement attached to the cross member, the reinforcement including a bridge spanning the channel and tabs disposed on the weld flanges that suspend the bridge within the channel; and
    a floor pan having a plurality of floor pan beads separated by base portions of the floor pan, wherein the floor pan is supported on the cross member and the reinforcement.

12. The pickup truck bed of claim 11 wherein the urethane isolator is attached to a frame component that partially encloses the cross member on an outer side of the cross member.

13. The pickup truck bed of claim 11 wherein the bridge supports a base portion of a floor pan bead of the floor pan of a pickup truck.

14. The pickup truck bed of claim 11 wherein a base portion of a floor pan bead of the floor pan is welded to the weld flanges.

15. The pickup truck bed of claim 14 wherein the front and rear weld flanges define at least one recess, wherein at least one of the tabs are received in the recess and locates the reinforcement on the cross member, and wherein a top surface of each of the tabs is flush with an upper surface of the cross member.

16. The pickup truck bed of claim 14 wherein the front and rear weld flanges define a plurality of recesses, wherein each of the tabs are received in one of the recesses and locate the reinforcement on the cross member, and wherein the tabs and recesses are disposed on the reinforcement below a floor pan bead.

17. The pickup truck bed of claim 11 wherein the bridge defines at least one aperture to lighten the reinforcement.

18. The pickup truck bed of claim 11 wherein a recessed rib is provided on the bridge to strengthen the bridge.

19. The pickup truck bed of claim 11 wherein a base portion of a floor pan bead rests upon the front and rear weld flanges and an upper surface of the bridge.

20. The pickup truck bed of claim 11 further comprises:
    the urethane isolator is attached to a frame component that partially encloses the cross member on an outer side of the cross member defining the channel; and wherein a base portion of a floor pan bead of the floor pan is welded to the weld flanges, wherein the front and rear weld flanges define a plurality of recesses, wherein the tabs are received in the recesses and locate the reinforcement on the cross member, wherein a top surface of the tabs are flush with an upper surface of the cross member, and wherein the tabs and recesses are disposed on the reinforcement below an upper portion of a floor pan bead.

* * * * *